United States Patent [19]

Cawley et al.

[11] Patent Number: 5,203,671
[45] Date of Patent: Apr. 20, 1993

[54] APPARATUS FOR PALLETIZING BUNDLES OF PAPER

[75] Inventors: W. D. Cawley, Port Neches; Joe C. Beavers, Sour Lake; David Hayes, Lumberton, all of Tex.

[73] Assignee: C&D Robotics, Beaumont, Tex.

[21] Appl. No.: 727,200

[22] Filed: Jul. 9, 1991

[51] Int. Cl.⁵ ............................................. B65G 57/22
[52] U.S. Cl. .............................. 414/791.6; 414/792.9; 414/799; 414/902; 414/907; 53/540; 364/478
[58] Field of Search ............... 414/792.9, 791.6, 902, 414/791.5, 792.5, 789.9, 790.2, 799, 907, 273, 760; 53/536, 540, 580, 587, 588; 364/478, 513, 468

[56] References Cited

U.S. PATENT DOCUMENTS

| | | | |
|---|---|---|---|
| Re. 33,416 | 10/1990 | Konishi et al. | 364/478 |
| 4,083,461 | 4/1978 | Wangermann . | |
| 4,242,024 | 12/1980 | Buta et al. . | |
| 4,242,025 | 12/1980 | Thibault . | |
| 4,383,788 | 5/1983 | Sylvander . | |
| 4,419,035 | 12/1983 | Stobb | 414/799 X |
| 4,597,707 | 7/1986 | Cornacchia | 414/902 X |
| 4,610,592 | 9/1986 | Pienta . | |
| 4,641,271 | 2/1987 | Konishi et al. | 414/902 X |
| 4,658,715 | 4/1987 | Stobb . | |
| 4,692,876 | 9/1987 | Tenma et al. | 414/900 X |
| 4,697,689 | 10/1987 | Carrell . | |
| 4,746,255 | 5/1988 | Roccabianca et al. | 414/792.9 X |
| 4,934,123 | 6/1990 | Salzsauler | 53/588 X |
| 5,005,335 | 4/1991 | Yourgalite | 53/588 X |
| 5,046,303 | 9/1991 | Becicka et al. | 53/587 X |
| 5,088,877 | 2/1992 | Henk | 414/799 X |

FOREIGN PATENT DOCUMENTS

| | | | |
|---|---|---|---|
| 8300942 | 3/1983 | France | 414/902 |
| 216830 | 12/1983 | Japan | 414/902 |
| 206731 | 9/1986 | Japan | 414/902 |

Primary Examiner—Michael S. Huppert
Assistant Examiner—Scott L. Lowe
Attorney, Agent, or Firm—Fulbright & Jaworski

[57] ABSTRACT

An apparatus for stacking irregular height bundles of paper onto a shipping pallet. Height detectors measure bundles traveling on a conveyor. The height data is utilized by a computer system to control an accumulator to accumulate and stack bundles to a predetermined height and then move the bundles to a storage compartment. The computer instructs a robot to move the stored bundles and place them in a compartmentalized guide box on a pallet in a substantially level predetermined layer height.

5 Claims, 8 Drawing Sheets

(FROM/TO FIG. 9')

418 — IS A BUNDLE ENTERING THE ACCUMULATOR? — YES → ACCUMULATE BUNDLE (420) → REMOVE BUNDLE FROM QUEUE (422)

NO ↓

(TO/FROM FIG. 11)
(FROM/TO FIG. 10)

Fig. 11

424 — IS ACCUMULATION WITHIN TOLERANCE RANGE OF BEING COMPLETE? — YES → EJECT ACCUMULATED BUNDLE TO STORAGE (426) → (FIG. 16, 428a) DETERMINE BUNDLE DESTINATION (428) → ZERO ACCUMULATION (430)

NO ↓

(TO/FROM FIG. 12)

APPARATUS FOR PALLETIZING BUNDLES OF PAPER

BACKGROUND OF THE INVENTION

1. Field of the Invention

The present invention is directed to a method and apparatus for handling, moving and stacking bundles of paper such as magazines. More particularly, the present invention is directed to a method and apparatus for efficiently handling and moving irregular-height bundles of strapped, banded, loose, or shrink wrapped magazines from a postal routing bundling machine and evenly stacking the bundles magazines onto a pallet.

In the magazine publishing and distribution business, magazines are prepared for shipment through the United States Postal Service by placing the names and addresses of the subscribers on the magazines. The Postal Service prefers to receive these magazines in presorted bundles arranged according to postal routing and gives a discount for bundles so arranged. Postal routing refers to zip code, carrier route, walk route, etc.

A bundling machine is used to bundle magazines according to postal routing. Depending on the number of magazines going to a particular postal route, the magazine bundling machine may bundle more than one bundle of magazines per postal route, however, there may be only enough magazines for a smaller bundle. Therefore, a magazine bundle may be between a certain minimum and maximum height. Generally, the height of a magazine bundle may be from two inches to a maximum of seven inches in height.

After the magazines are bundles according to postal routing, the bundles may be placed on pallets for handling by the Post Office. These bundles were placed by hand on the pallet, with the object of trying to even out the level of the stacked bundles for stable shipping. However, magazine bundle heights being unpredictable, caused many problems for achieving even pallet stacking levels necessary for stable shipment. Much time was spent in trying to stack the magazine bundles as evenly as possible, but due to time constraints and the skill levels of shipping personnel, stable pallet loads were not always achieved.

SUMMARY OF THE INVENTION

The present invention is directed to an apparatus that receives magazines bundles by postal routing from a bundling machine. The magazine bundles arrive on a conveyor wherein the height of each bundle is measured and recorded in a digital computer memory. Next the bundles arrive at an accumulator which guides the bundles into a collection box wherein multiple bundles are stacked. When the magazine bundles are stacked to a height determined by the computer program of the invention, the magazine bundles contained therein are pushed into a shuttle box by an air actuated ram which clears the collection box so that the next set of magazine bundles may be similarly collected therein.

The shuttle box is adapted for receiving an end effector. The end effector fits on top of the shuttle box and receives the magazine bundles contained therein. The magazine bundles are pushed up and into the end effector by means of an air actuated elevator. The bundles are held in the end effector by fingers located at its bottom. A computer controlled robot moves the end effector to a predetermined location on the pallet at which time the end effector fingers release the bundles.

The end effector may accept up to 14 inches of magazine bundles from the shuttle box. The end effector may be rotated 90° for interlocking of the bundles. In addition, the end effector may be rotated 180° in order to place the magazine bundles in such as way as to balance tapered bundle loads.

The computer program of the invention determines where the end effector places the magazine bundles on the pallet. The computer program keeps track of where these bundles are placed on the pallet and attempts to stack the bundles so as to create a layer of bundles wherein the top terrain of the stack is mostly flat or may be slightly concave toward the middle. The purpose of obtaining a flat or slightly concave toward the middle terrain on the top of a layer of stacked magazine bundles is to create a stabilized base for the stacking of pallets one on top of another.

Magazines may not stack flat due to the method of binding or card inserts contained in each magazine, thus, a bundle may bulge in the middle or at an edge. This bulge may cause uneven stacking of the bundles with the possibility of the bundles toppling off of the pallet. Heretofore, workers held the bundles in place while plastic shrink wrap was placed around the perimeter of the magazine bundles to hold them in a mostly vertical position on the pallet.

The invention solves the problem of unstable stacks by using a guide box to help keep the magazine bundles being stacked from toppling over during the development of a bundle layer. The guide box has a compartment for each location on the pallet. Each compartment is open at the top and bottom of the guide box allowing the stacked bundles to pass through from the end effector to the pallet location The computer controlled robot moves the end effector containing the bundles to predetermined locations on the pallet until all locations are filled to a height giving a mostly level layer. The pallet is supported by a scissor lift that lowers the pallet a distance necessary to bring the just completed layer out of the guide box. While the pallet is being lowered, a stretch wrapping device travels around the perimeter of the pallet wrapping the just completed layer of magazine bundles as they emerge from the bottom of the guide box. The stretch wrap prevents the bundles from toppling over.

The magazine bundle layers may be up to 14" high and there may be four layers of bundles contained on the pallet. In addition, for equal height bundles, e.g. newsstand distribution, the system of the invention may shift the location of the guide box relative to the just completed layer so that the next layer of magazines stacked thereon interlock giving a more stable pallet load. Another embodiment of the guide box has some of the location compartments turned 90 degrees to improve the interlocking of layers. The guide box may be shifted horizontally so as to offset the presently forming layer locations from the prior layer locations, thus, overlapping the different layers for equal height bundles.

The computer system uses control contour zones which are the perimeter and the inner locations of the pallet. It is important that the outer perimeter bundles be of a height slightly greater than or equal to the inner bundle heights so that the next layer on top will maintain its stability without toppling over the edges of the pallet. Therefore the computer will attempt to place a stack in each location such that the accumulated height of that location will closely match the instantaneous ideal height for that location. This may not always be possible. However, by judicial selection of the locations, the system of the invention may get the contour of a layer within an acceptable tolerance. So long as the outer perimeter of the stack terrain is slightly above the inner bundle locations, then the magazines will stack in a stable fashion.

The computer system of the invention keeps track of the cumulative bundle height of each location and if the inner bundle locations of the first layer are of such height to be significantly less than the outer perimeter location heights, then the computer system will remember these heights and add the second layer of bundle heights to compensate for the concavity towards the middle and will, thus, have the second layer top terrain more level than the first layer.

Several options may be used to improve the efficiency of the stacking operation. One of them is to have a location toward the middle of the pallet that is left empty until all of the other locations of a bundle layer are completed. The problem occurs sometimes when a bundle comes in that is so large that it cannot be properly placed in the existing topology of the then existing bundle layer, i.e., there are no locations that will accept the bundle height. This occurs when a bundle is near the maximum of six or seven inches in height. The program of the computer system is such that a bundle layer height is obtained by stacking each magazine bundle until a certain maximum level is reached. Thus, if only four inches are left to complete a stack and a six inch bundle comes in, this bundle cannot be placed on the stack because it would exceed the maximum height of the bundle layer.

A second option of the invention comprises the use of at least one holding station where a magazine bundle may be shunted off of the normal order of arrival from the magazine bundling machine wherein the bundle so shunted into the holding station may be retrieved later when an available layer location is determined. Thus, having at least one holding station allows the computer system to shunt off a fairly tall, i.e., six or seven inch, magazine bundle for stacking on the next layer.

A third option of the present invention uses a deep hole in the middle of the pallet stacks that is twice as deep as a normal layer height. This gives the system of the invention more ways to accept bundles of unusual height. Therefore, the use of a holding station and a deep hole in the middle of a stack allows the computer system of the invention to place magazine bundles of heights greater than would be possible without either of the above options.

An object of the present invention is to stack a pallet with bundled magazines according to the postal routing in mostly level layers having stable loading characteristics that may be enhanced by a stretch wrap on the outer perimeter of the magazine bundle layers.

A further object of the present invention is to interlock each bundle layer by offsetting the orientation of the magazines thus improving the load stability of the pallet containing the stacked bundles.

Another object of the present invention is to use a guide box to prevent uneven magazine bundles from toppling over while stacking on a pallet.

Yet a further object of the present invention is to use a holding station to retain a bundle having a height in excess of what may be possible to stack in a layer but could be placed in the next layer of the stack.

Still another object of the present invention is to use a deep hole in the middle of a stack allowing placement of magazine bundles of heights greater than would be possible otherwise.

Other and further objects, features and advantages will be apparent from the following description of the preferred embodiment of the invention, given for the purpose of disclosure and taken in conjunction with the accompanying drawings.

BRIEF DESCRIPTION OF THE DRAWINGS

FIG. 3b is a cross-sectional view taken along 3b—3b of FIG. 3a;

FIG. 3c is a cross-sectional view taken along 3c—3c of FIG. 3a;

DESCRIPTION OF THE PREFERRED EMBODIMENT

Figure 1:
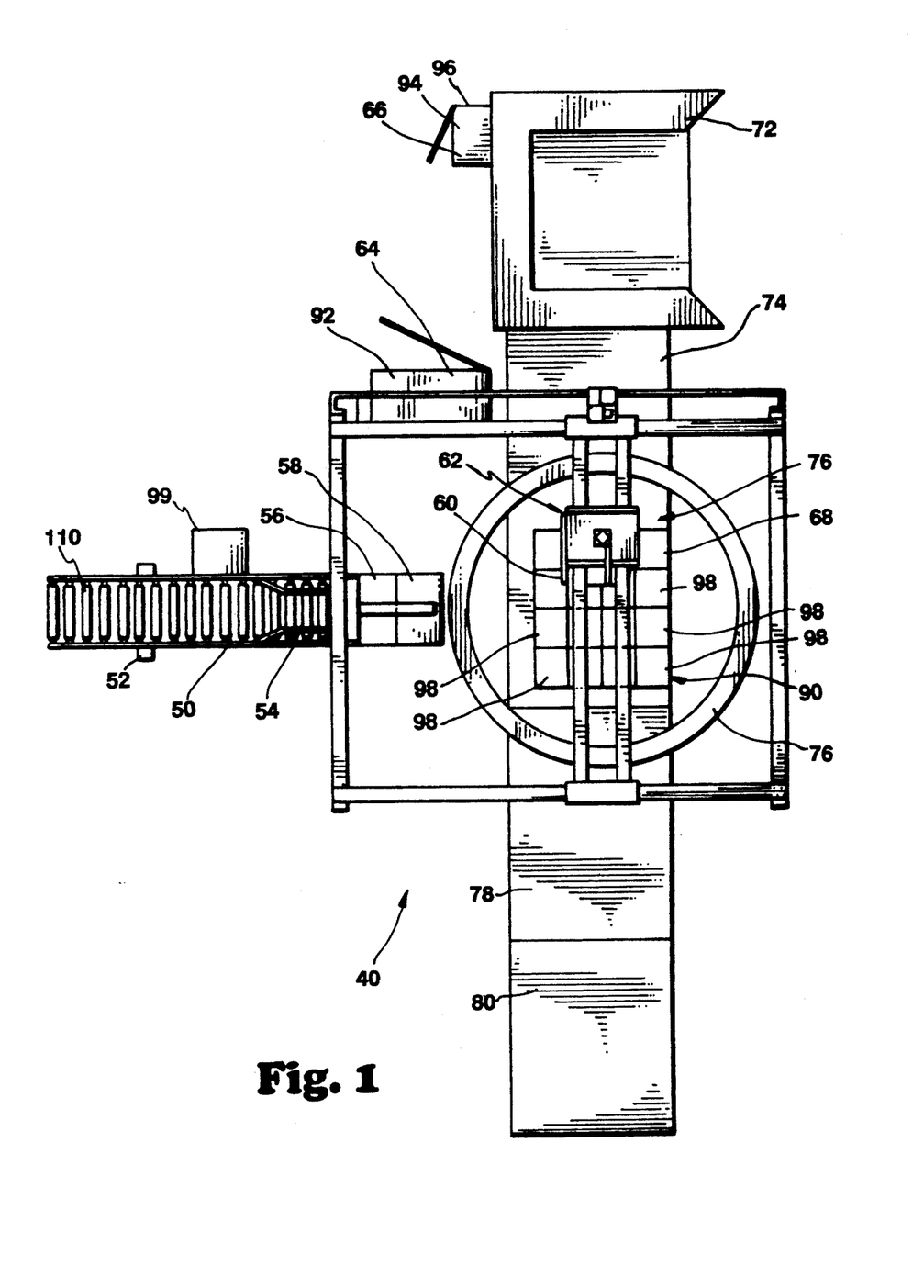
FIG. 1 is a schematic plan view of the preferred embodiment of the present invention.
Figure 2:
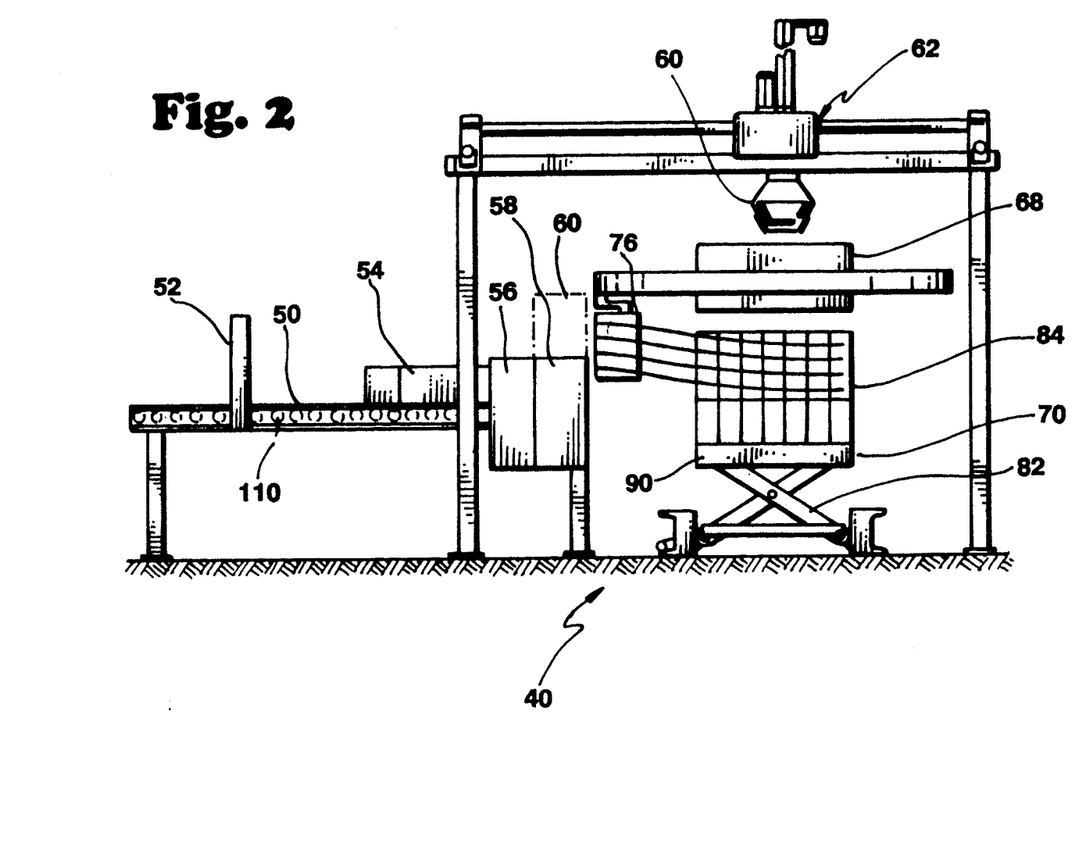
FIG. 2 is a schematic elevational view of FIG. 1.

The present invention provides an apparatus and method for stacking bundles such as magazines bundled by postal routing onto a pallet for shipment by the United States Post Office. Referring now to FIGS. 1 and 2, the reference numeral 40 indicates generally the apparatus of the present invention. The apparatus 40 includes a bundle conveyor 50 which receives the bundled magazines having the same postal routing from a magazine bundling machine (not shown) and passes these bundles through a height gauge 52, as more fully described hereinafter, wherein the height of each bundle is measured, then an accumulator 54 guides and properly orients the bundles for collection in a collection box 56. After at least one bundle of magazines is collected in the collection box 56, the magazines are moved to a shuttle box 58. The shuttle box 58 is adapted to receive an end effector 60 attached to a robot 62. The robot 62 places the end effector 60 on top of the shuttle box 58 so that the magazine bundles contained in the shuttle box 58 may be pushed up into and held by the end effector 60. The robot 62 then moves the end effector 60 containing the magazine bundles to a pallet 90 where the bundles are placed thereon.

Figure 4:
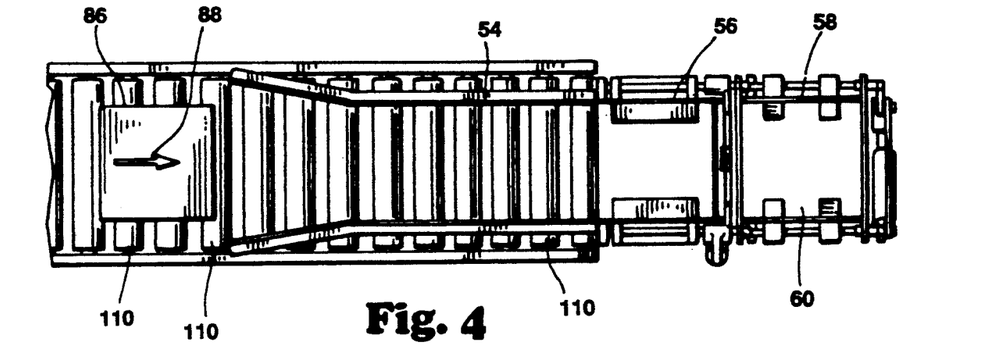
FIG. 4 is a schematic plan view of the infeed conveyor and collection box of the invention.
Figure 5:
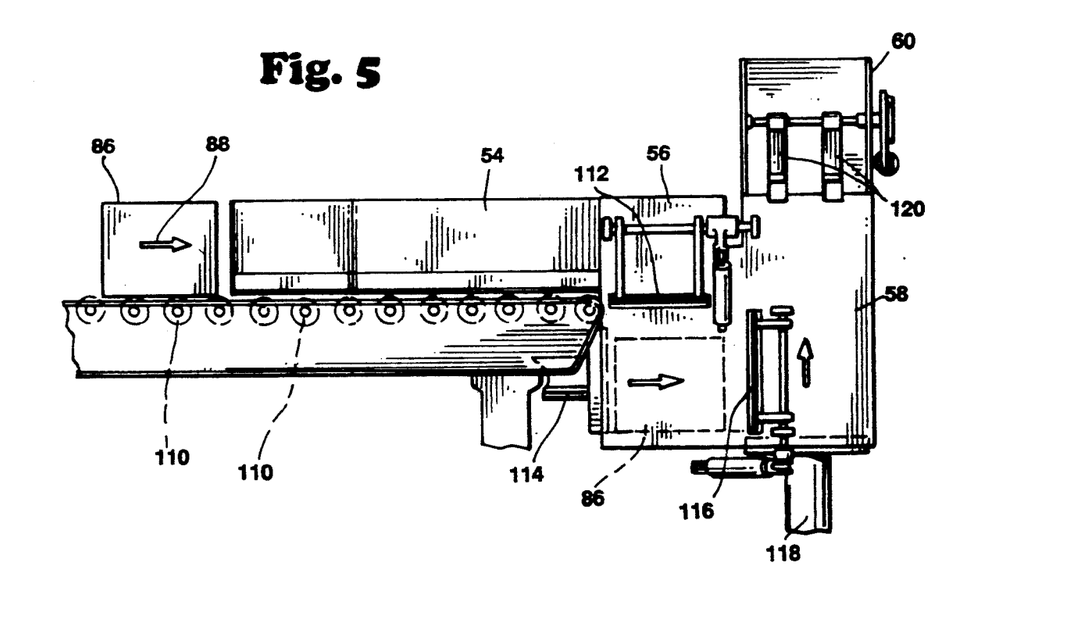
FIG. 5 is a schematic elevational view of the infeed-collection box and shuttle box system of the invention.

Referring now to FIG. 4, a magazine bundle 86 moves in direction 88 along conveyor rollers 110 into the upper portion of accumulator 54. Referring to FIG. 5, the bundle 86 is held in the upper portion of the accumulator 54 when first holding fingers 112 are closed. When the fingers 112 are open, bundle 86 drops into the lower portion of the collection box 56. Then fingers 112 close in anticipation of receiving the next bundle 86.

More than one bundle 86 may be collected in the lower part of the collection box 56. When a certain height is reached by the bundle or bundles contained therein, a pushing ram 114 moves the bundles 86 past open second holding fingers 116 into the shuttle box 58. Fingers 116 close and shuttle elevator 118 lifts bundles 86 into the end effector 60. Third holding fingers 120 close and, thus, retain the bundles 86 in the end effector 60 when the robot 62 moves the end effector and bundles contained therein to the pallet 90.

Figure 3A:
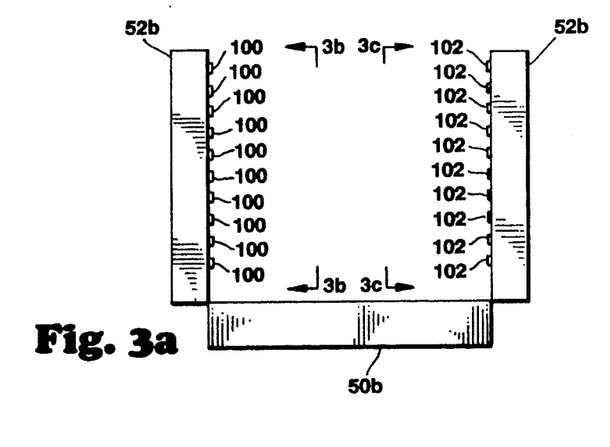
FIG. 3a is a schematic elevational view of the bundle height measuring apparatus of the invention.
Figure 3B:
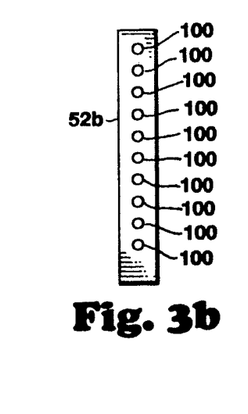
Figure 3C:
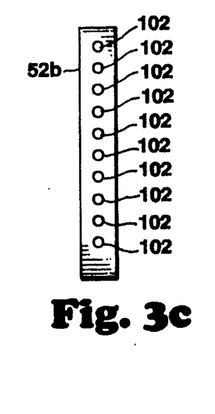

Referring back to FIG. 1, a robot control panel 64 contains an electronic computer control system 92 for controlling the robot 62, and system panel 66 contains an operator interface 96 and second computer system 94 for determining placement of the magazine bundles on the pallet 90. The program of computer system 94 controls the placement of the magazine bundles by using the height of each bundle obtained from height gauge 52 to determine a placement location on the pallet 90. As illustrated in FIGS. 3a to 3c, the height gauge 52 may have infrared receivers 100 and infrared transmitters 102 located at different heights so that a bundle passing through height gauge 52 on conveyor 50 will block the transmission of the corresponding infrared transmitters 102 from being received by the corresponding receivers 100. Thus, the bundle height may be easily measured and sent to the computer system 94.

The computer program uses the height information from the height gauge 52 in determining where the bundles are placed on the pallet 90. The computer program of computer system 94 causes the robot 62, by means of its control computer 92, to stack the bundles so as to create a layer of bundles wherein the top terrain of the stack is mostly flat or may be slightly concave toward the middle. The purpose of obtaining a flat or slightly concave toward the middle terrain on the top of a layer of stacked magazine bundles is to create a stabilized base for the next layer of bundles.

Magazines may not stack flat due to the method of binding or card inserts contained in each magazine, thus, a bundle may bulge in the middle or at an edge. This bulge may cause uneven stacking of the bundles with the possibility of the bundles toppling off of a pallet. Heretofore, workers held the bundles in place while plastic stretch wrap was placed around the perimeter of the magazine bundles to hold them in a mostly vertical position on a pallet.

Figure 6:
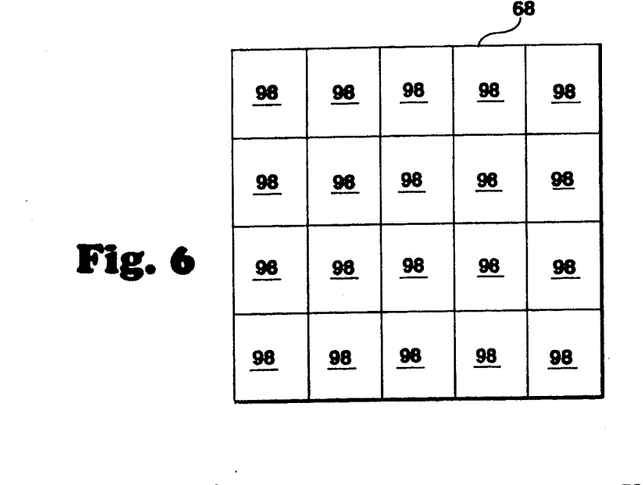
FIG. 6 is a schematic plan view of a typical guide box of the invention.

The present invention solves this problem by using a guide box 68 to help keep the magazine bundles being stacked from toppling over during the development of a bundle layer. Referring now to FIG. 6, the guide box 68 has compartments or pocket locations 98 for all locations on the pallet 90. Each compartment 98 is open at the top and bottom of the guide box 68 allowing the stacked bundles to pass through from the end effector 60 to the locations on pallet 90. Movement of the robot 62 is controlled by computer 92 after receiving directions from computer 94 and moves the end effector 60, containing the bundles, to predetermined locations on the pallet 90 until all locations are filled to a height giving a consistently level layer.

As best illustrated in FIG. 2, the pallet 90 is supported by a scissor lift 82 that lowers the pallet 90 a distance equal to the height of the just completed layer. While the pallet 90 is being lowered, a stretch wrapper 76 travels around the perimeter of the pallet 90 wrapping the just completed layer of magazine bundles as they emerge from the bottom of the guide box 68. The stretch wrap prevents the bundles from toppling over.

Figure 7:
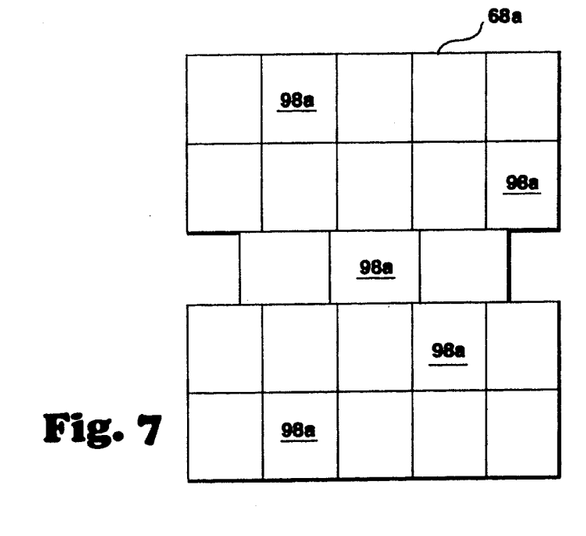
FIG. 7 is a schematic plan view of an alternate embodiment of a typical guide box of the invention.

Each magazine bundle layer may be up to 14" high and there may be four layers of bundles contained on a pellet. In addition, the system of the invention may shift the location of the guide box 68 relative to the just completed layer so that the next layer of magazines stacked thereon interlock thereby giving a more stable pallet load. FIGS. 6 and 7 illustrate non-interlocking and interlocking guide box designs, respectively. Several compartments 98a of the guide box 68a illustrated in FIG. 7 are turned 90 degrees to improve the interlocking of layers. The end effector 60 containing the bundles may be turned 90 degrees by the robot 62. The guide box may also be shifted horizontally by the robot 62 so as to offset the presently forming layer locations from the prior layer locations, thus, overlapping the different layers.

Referring now to FIG. 1, a holding station 99 is illustrated. The holding station 99 allows a magazine bundle to be shunted off of the normal order of arrival from the magazine bundling machine (not shown) wherein the bundle so shunted into the holding station 99 may later be retrieved when an available layer location is determined. Thus, having at least one holding station 99 allows the program of the computer system 94 to shunt off a fairly tall, i.e., six or seven inch, magazine bundle for stacking on a subsequent layer.

COMPUTER SOFTWARE CONTROL PROGRAM

The present invention includes a computer system 94 having a program with a novel set of instructions to control the operation of receiving magazine bundles from a bundling machine (not shown), storing the measured height of each bundle and then determining how many bundles are to be held in the collection box 56 before transferring the bundles to the shuttle box 58. The system of the invention moves the bundles from the collection box 56 to the end effector 60. The end effector 60 then places the bundles on the pallet 90 is such a manner as to create a layer whose top terrain will be stable for the next layer placed thereon.

The program of the computer system 94 uses control contour zones which are the perimeter and the inner locations of the pallet 90. It is important that the outer perimeter bundles be of a height slightly greater than or equal to the inner bundle heights so that the next layer placed thereon will maintain its stability without toppling over the edges of the pallet 90. Therefore the computer will attempt to place a stack in each location such that the accumulated height of that location will closely match the instantaneous ideal height for that location.

This may not always be possible. However, by judicial selection of the locations, the program controls the contour of a layer within an acceptable tolerance. So long as the outer perimeter of the stack terrain is slightly above the inner bundle locations, then the magazines bundles will stack in a stable fashion.

The program of computer 94 keeps track of the cumulative bundle location heights and if the inner bundle locations of the first layer are of such height to be significantly less than the outer perimeter bundle location heights, then the computer system will remember these heights and add the second layer of bundle heights to compensate for the concavity towards the middle and will, thus, have the top terrain of the second layer more level than the first layer.

Referring generally to FIGS. 8 through 15, schematic block diagrams are illustrated of the control program of the present invention. Step 400 begins the main loop 400 (FIG. 8) and step 402 initiates setup of system operating parameters such as layer height, stack offset, etc. Step 404 does a one time initialization then step 406 assumes that there is a new load and zeros all pocket height registers in the program. Next step 408 sets up a new target height for each pocket location of the pallet 90.

Step 410 tests for a bundle passing through the height gauge 52. If a bundle is present then steps 412 and 414 measure the bundle height and place it in a bundle height queue, respectively. If step 410 determines that a bundle is not present at height gauge 52 then step 418 determines if the bundle is entering the accumulator 54.

Next step 416 determines if the bundle just measured in step 412 will cause the bundle height accumulator to overflow. If overflow would occur then step 416 causes the program of computer 94 to jump to step 426 (FIG. 11) more fully described hereinafter. If no overflow occurs then step 418 determines if the bundle is entering the accumulator 54. If a bundle is not entering the accumulator 54 then step 424 tests whether the present accumulation of bundles is complete. When a bundle enters the accumulator 54, steps 420 and 422 accumulate the entering bundle and remove it from the queue, respectively. A bundle is accumulated when it enters the upper part of collection box 56 (FIGS. 1 and 2) and drops past open fingers 112 (FIG. 5) into the lower part of the collection box 56.

The bundles accumulate in this fashion until the height of the bundles are within a predetermined tolerance. Step 424 determines whether the accumulated bundles are within the required height tolerance range. If the accumulated bundles have not yet reached the predetermined height then step 424 causes the program of computer system 94 to jump to step 432 (FIG. 12) more fully described hereinafter. When the accumulated bundles are within the predetermined height, steps 424 and 426 cuase the computer system 94 to open fingers 116 and have ram 114 push the collected bundles from the lower part of collection box 56 into the shuttle box 58 (FIG. 5).

Figure 14:
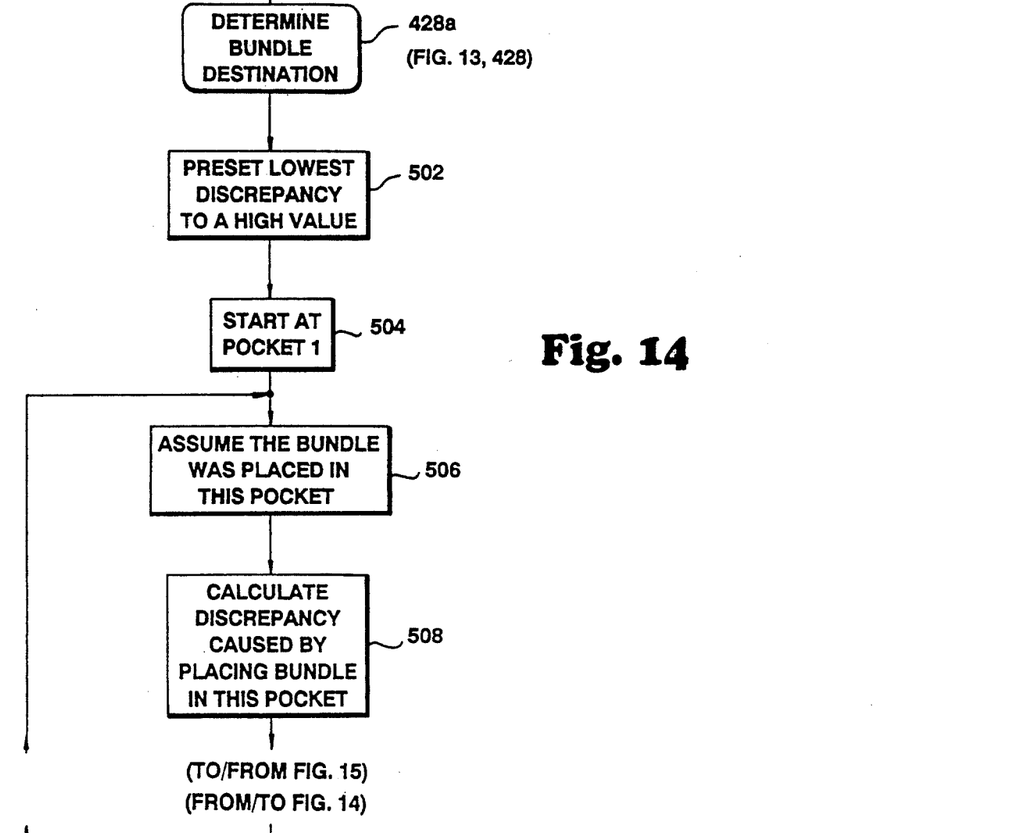
Figure 15:
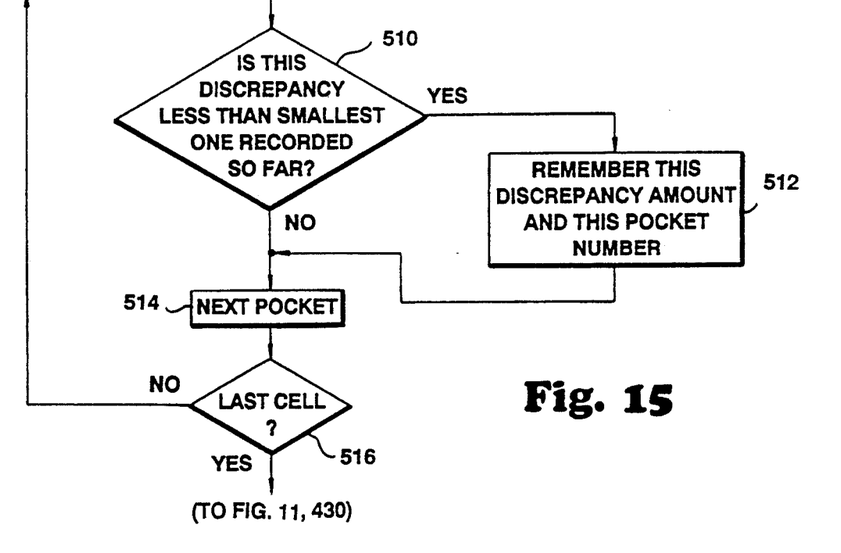

Step 428 determines where the accumulated bundles are to be placed on the pallet 90. Referring now to FIGS. 14 and 15, step 428a starts a subroutine that makes this determination. A purpose of this subroutine is to make a layer of magazine bundles with as even a top terrain as possible. This subroutine calculates the height discrepancies for each pocket location 98 on the pallet 90 and directs the robot 62 to place the accumulated bundles into a pocket location resulting in the smallest discrepancy for the desired layer height.

Steps 502 and 504 initialize the subroutine by presetting the lowest discrepancy to a high value and starting the comparison calculations at the first pocket location, respectively. Steps 506 and 508 calculate the height discrepancy that will result if the bundles are placed in the chosen pocket location. Step 510 determines if the height discrepancy predicted is the smallest so far and, if so, step 512 stores the discrepancy value and pocket location in the computer system 94 memory for use in subsequent height comparisons using other pocket locations.

Figure 11:
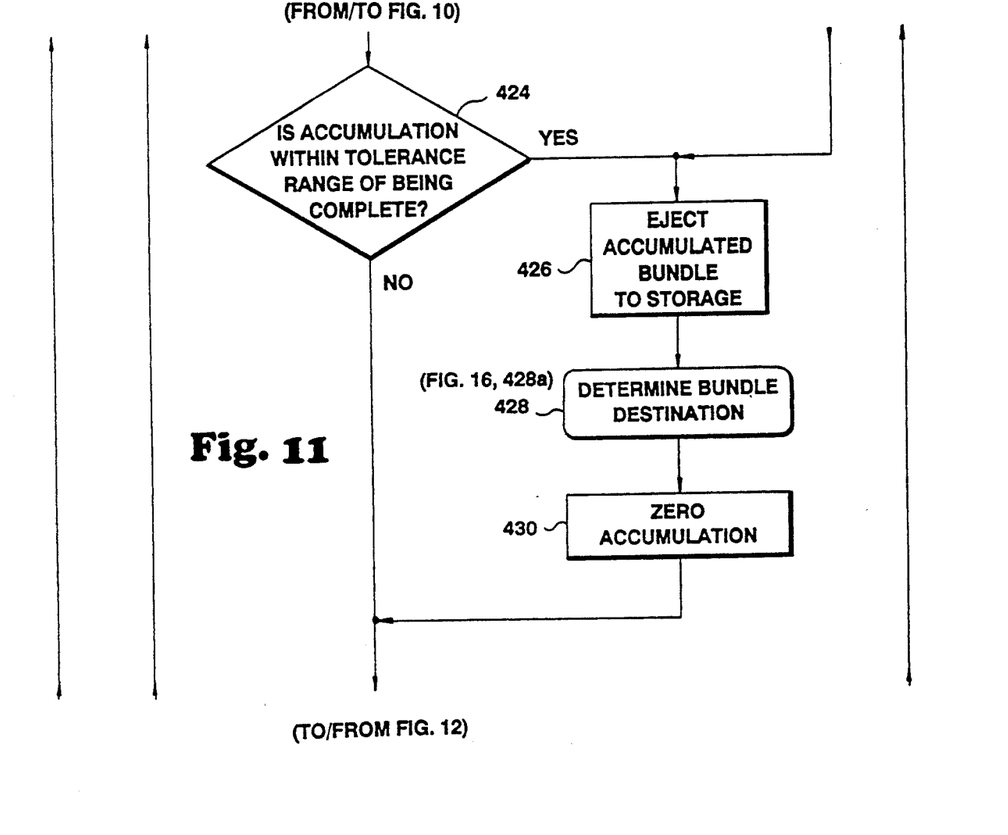
Figure 12:
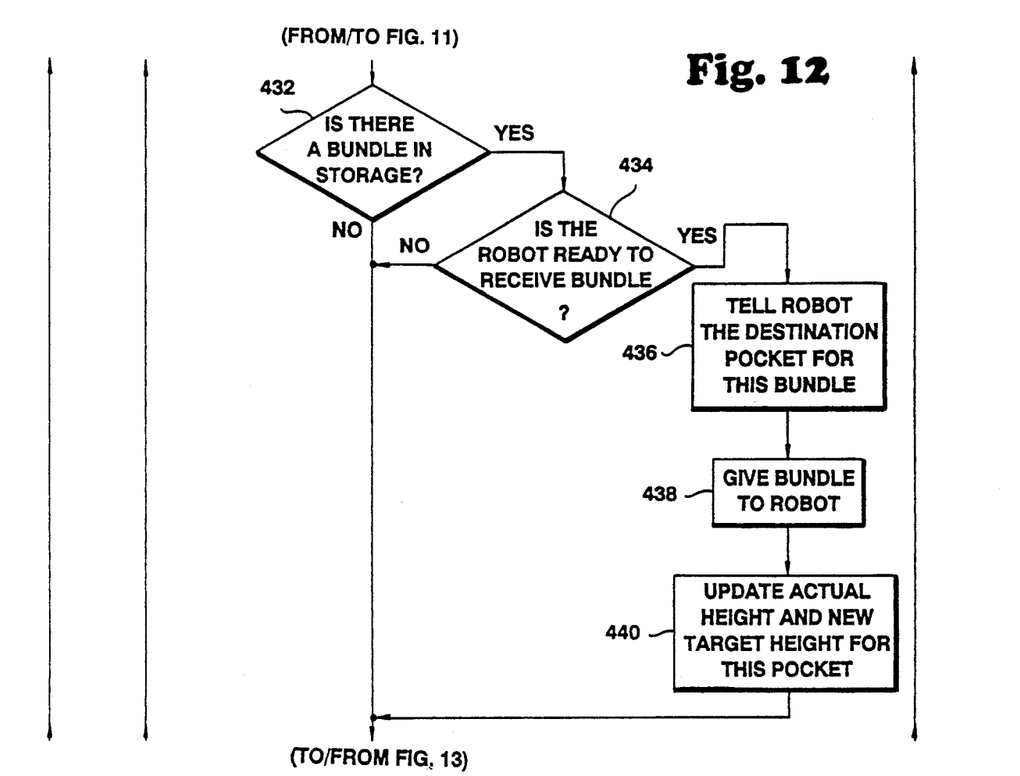
Figure 13:
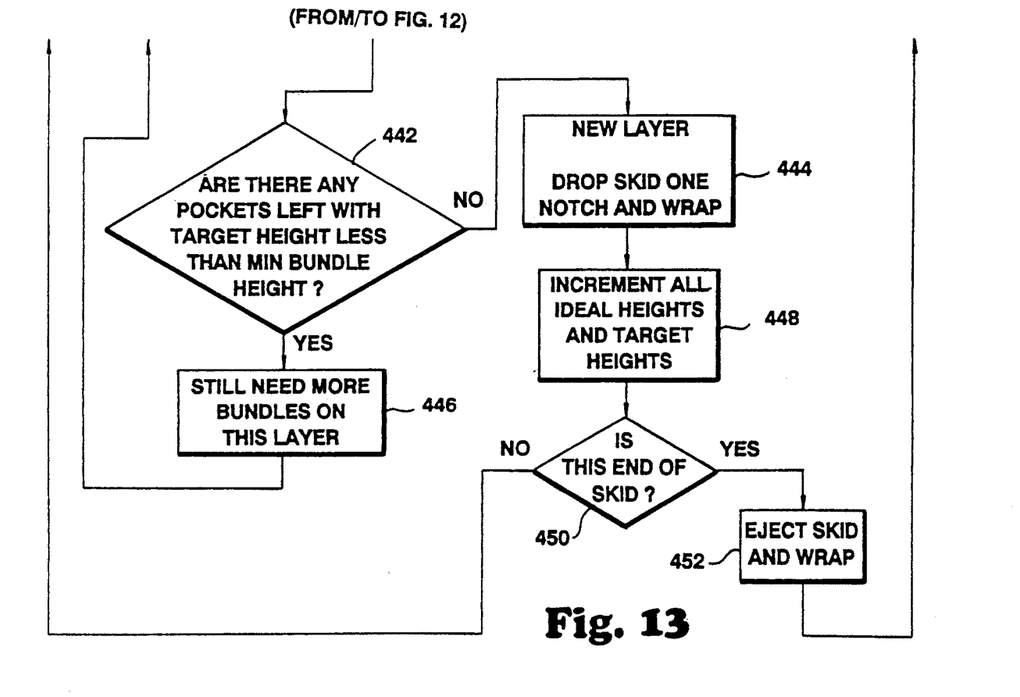

If the calculation of height discrepancy does not result in the lowest value than step 514 increments the program to the next pocket location and step 516 determines if the last pocket location of the stack has been evaluated. If the last pocket location has not been evaluated step 516 causes step 506 to begin the steps above for the next pocket. The subroutine 428a continues in this manner until all pockets are evaluated with the current accumulated bundles for minimum height discrepancy of the layer. When the last pocket is so evaluated and the best choice of a pocket location is made, step 516 returns control back to main program step 430 (FIG. 11). Step 430 zeros the accumulation register in anticipation of the next accumulation of bundles.

Step 432 determines whether the bundles are in storage in the shuttle box 58. If step 432 determines that the bundles are in storage, then step 434 checks if the robot 62 is ready to receive the bundles. When the robot 62 is ready, step 436 tells the robot computer control 92 which pocket location to place the bundle. Step 438 causes the shuttle elevator 118 to push the bundles up into the end effector 60 and close holding fingers 120. Then the robot removes the end effector 60 containing the magazine bundles and puts these bundles at the designated pocket location on pallet 90.

Figure 9:
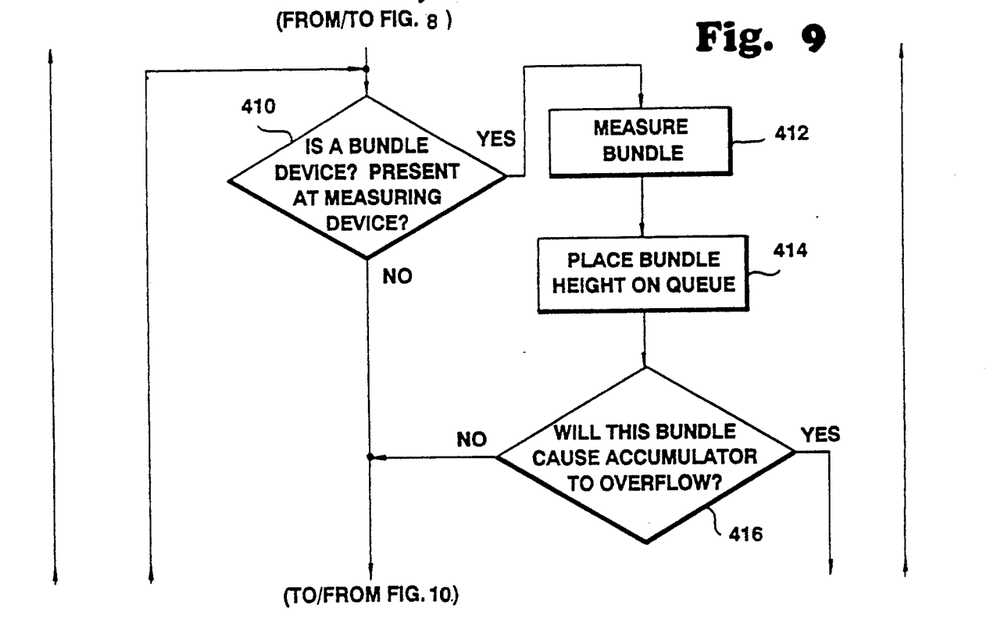
Figure 10:
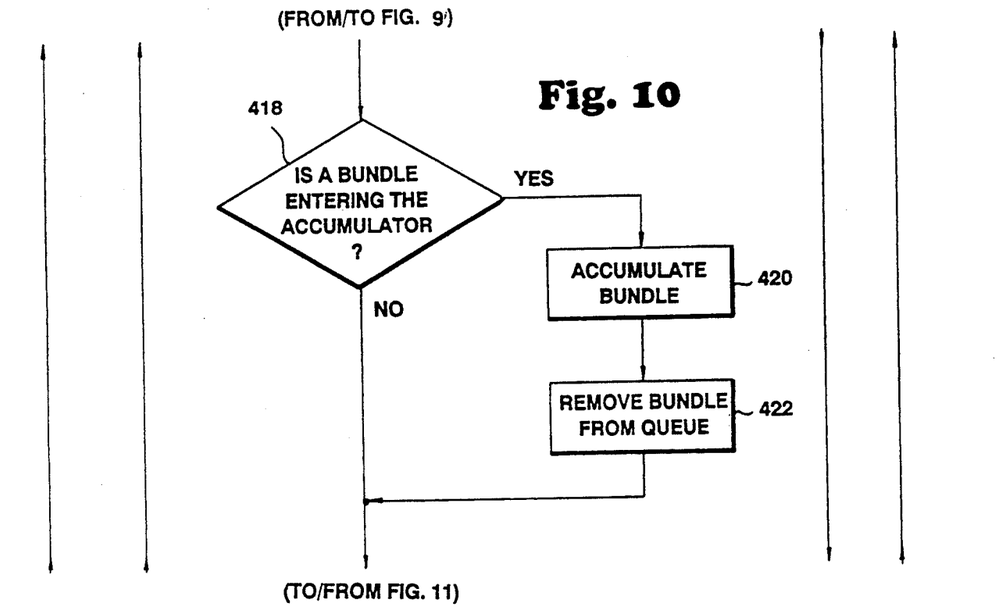

Meanwhile, step 440 updates the actual pocket location height created by placement of the most recently placed bundles and calculates a new target height for this pocket location. If steps 432 or 434 determine that there are no bundles in storage or the robot is not ready, respectively, then step 442 decides whether there are any pocket locations left with target heights less than the minimum bundle height. If step 442 finds at least one pocket location that may accept a bundle then step 446 returns program control back to step 410 (FIG. 9). Step 410 starts the accumulation of bundles again as described above.

When step 442 determines that there are no more pocket locations remaining in the present layer, then step 444 causes the scissor lift 82 to drop the pallet 90 by an amount equal to the present layer height and start wrapping the present layer with the stretch wrapper 76. Step 448 increments all of the pocket location heights both ideal and target. The computer program of the present invention tries to make the top terrain of the layer as flat as possible for best stacking and shipment stability. In doing so, the variations of pocket heights of the lower layers may not be precisely the desired height. The program of the present invention compensates for the actual height variances by remembering each pocket height and using these variances when figuring the pocket height calculations for the next layer.

Figure 8:
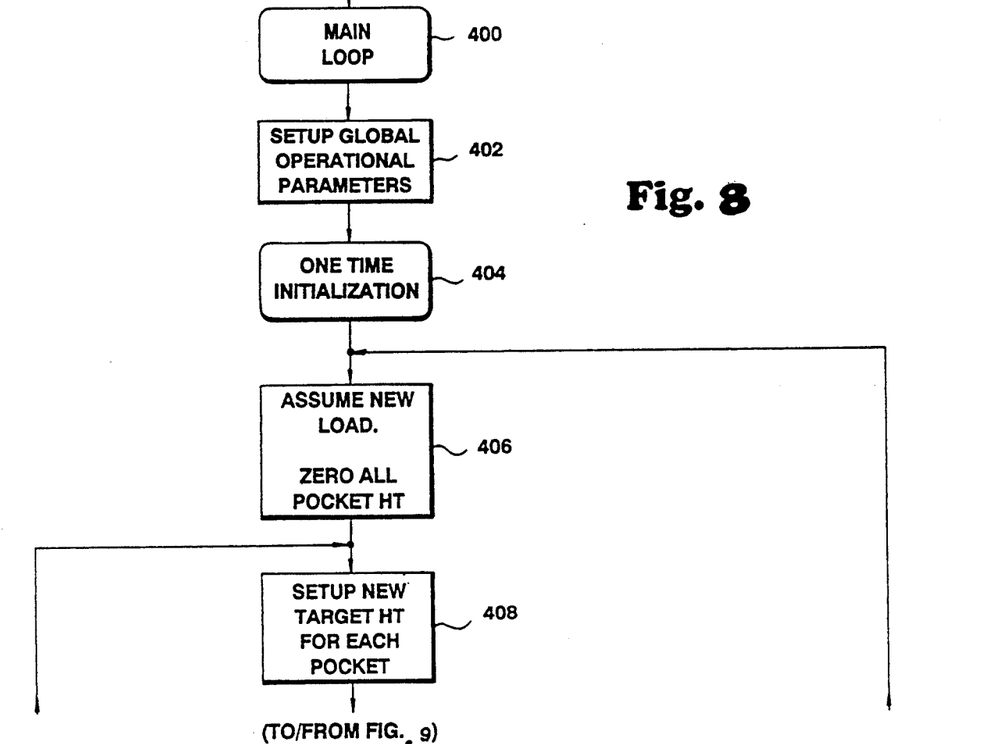
FIGS. 8 through 15 are schematic block diagrams of the logic sequences which form a part of the present invention.

Step 450 determines whether the pallet 90 loading is complete. If loading is not complete then step 450 returns program control to step 408 (FIG. 8). When the pallet 90 is fully loaded, step 452 causes the system of the present invention to final wrap and eject the pallet 90. Step 452 returns program control to step 406 (FIG. 8) so that the system of the present invention may begin loading a new pallet.

REMOVAL OF THE LOADED PALLET AND PLACEMENT OF A NEW PALLET FOR LOADING THEREON

Referring back to FIGS. 1 and 2, when the pallet 90 is fully loaded the scissor lift 82 drops the load station 70 on which the pallet 90 is supported to a level even with a powered pallet conveyor 78. Conveyor 78 may remove the pallet 90 from the load station 70, after which a dispenser 72 may place a empty pallet onto pallet conveyor 74. Conveyor 74 may place the new pallet 90 onto the load station 70. The scissor lift 82 raises the new pallet 90 into position for the start of a new loading operation as described above. Meanwhile, the pallet conveyor 78 may move the loaded pallet to gravity pallet conveyor 80 which may then move the loaded pallet to a shipping area.

ADDITIONAL EMBODIMENTS

A problem may occur when a bundle is so tall that it cannot be properly placed in the existing topology of the present layer being stacked, i.e., there are no pocket locations that will accept the height of the new bundle. This occurs when a bundle is near the maximum of six or seven inches in height. The program of the computer system 94 is such that a bundle layer height is obtained by stacking each magazine bundle until a certain maximum level is reached. Thus, if only four inches are left to complete a stack and a six inch bundle must be placed, then this bundle cannot be placed on the stack because it would exceed the maximum height of the present layer.

The system of the present invention may improve the efficiency of the stacking operation by leaving one pocket location, toward the middle of the pallet, empty until all of the other pocket locations of the present layer have been utilized. Another possibility uses a deep hole in the middle of the pallet stacks that may be twice as deep as the normal layer height. This gives the system of the invention more ways to accept bundles of unusual height.

A holding station 99, illustrated in FIG. 1, may be used for temporarily storing a bundle that cannot be readily placed on the present layer. Storing a magazine bundle of unusual height in the holding station 99 may improve the efficiency of stacking magazine bundles and result in an improvement in the layers being level and even. Therefore, the use of a holding station 99 and a deep hole in the middle of a stack allows the computer system 94 of the invention to more easily and efficiently place magazine bundles of unusual heights than would be possible without the above methods and apparatus.

The present invention, therefore, is well adapted to carry out the objects and obtain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. An apparatus for automating the placement of paper bundles onto a shipping pallet in substantially level layers comprising:
   a bundle conveyor;
   means for measuring bundle height as the bundles travel on said bundle conveyor;
   means downstream from the bundle conveyor for accumulating the bundles delivered by conveyor;
   means downstream from the accumulating means for temporarily storing bundles received from said accumulating means;
   a robot downstream from the temporarily storing means for placing any bundles in the storing means on a shipping pallet;
   a computer system comprising a computer programmed to receive bundle height signals from said measuring means, control the number of bundles accumulated in said accumulating means based on height, control the movement of the accumulated bundles to said storing means, and instruct said robot to remove any bundles from said storing means and place the bundles onto pallet locations wherein the bundles are stacked so as to achieve a substantially level predetermined layer height; and wherein the
   means for accumulating the bundles comprises:
   a guide for properly orienting the bundles arriving on said conveyor;
   a collection box having upper and lower parts;
   a pushing ram;
   first and second holding fingers;
   said first fingers being mounted between said collection box upper and lower parts, said second fingers being mounted between said collection box lower part and said storing means, wherein said first fingers hold a bundle arriving from said conveyor in said collection box upper part until said lower part is ready to accept the bundle and said second fingers hold the collecting bundles in said collection box lower part until said pushing ram pushes the collected bundles into said storage means, whereby the collection box is emptied so that more bundles may be collected therein.

2. An apparatus for automating the placement of paper bundles onto a shipping pallet in substantially level layers comprising:
   a bundle conveyor;
   means for measuring bundle height as the bundles travel on said bundle conveyor;
   means downstream from the bundle conveyor for accumulating the bundles delivered by conveyor;
   means downstream from the accumulating means for temporarily storing bundles received from said accumulating means;
   a robot downstream from the temporarily storing means for placing any bundles in the storing means on a shipping pallet;
   a computer system comprising a computer programmed to receive bundle height signals from said measuring means, control the number of bundles accumulated in said accumulating means based on height, control the movement of the accumulated bundles to said storing means, and instruct said robot to remove any bundles from said storing means and place the bundles onto pallet locations wherein the bundles are stacked so as to achieve a substantially level predetermined layer height; wherein the means for storing the bundles comprises:
   a rectangular container having an open top adapted for receiving said robot; and
   a shuttle elevator for pushing any bundles stored in said container up and into said robot.

3. An apparatus for automating the placement of paper bundles onto a shipping pallet in substantially level layers comprising:
   a bundle conveyor;
   means for measuring bundle height as the bundles travel on said bundle conveyor;
   means downstream from the bundle conveyor for accumulating the bundles delivered by conveyor;
   means downstream from the accumulating means for temporarily storing bundles received from said accumulating means;
   a robot downstream from the temporarily storing means for placing any bundles in the storing means on a shipping pallet;

a computer system comprising a computer programmed to receive bundle height signals from said measuring means, control the number of bundles accumulated in said accumulating means based on height, control the movement of the accumulated bundles to said storing means, and instruct said robot to remove any bundles from said storing means and place the bundles onto pallet locations wherein the bundles are stacked so as to achieve a substantially level predetermined layer height;

an end effector, said end effector adapted to receive the bundles from said storage means;

fingers for holding the bundles in said end effector;

means for moving said end effector between said storage means and the pallet; and a guide box having an open bottom for preventing the bundles from toppling over while being stacked on the pallet, wherein a load station holding the pallet is lowered by a scissor lift a distance equal to the bundle layer height while a wrapping means wraps the bundles as they pass through the open bottom of said guide box.

4. The apparatus of claim 3, wherein the guide box includes a plurality of compartments.

5. An apparatus for automating the placement of paper bundles onto a shipping pallet in substantially level layers comprising:

a bundle conveyor;

means for measuring bundle height as the bundles travel on said bundle conveyor;

means downstream from the bundle conveyor for accumulating the bundles delivered by conveyor;

means downstream from the accumulating means for temporarily storing bundles received from said accumulating means;

a robot downstream from the temporarily storing means for placing any bundles in the storing means on a shipping pallet;

a computer system comprising a computer programmed to receive bundle height signals from said measuring means, control the number of bundles accumulated in said accumulating means based on height, control the movement of the accumulated bundles to said storing means, and instruct said robot to remove any bundles from said storing means and place the bundles onto pallet locations wherein the bundles are stacked so as to achieve a substantially level predetermined layer height;

a load station;

a scissor lift;

means for wrapping the bundles stacked on the pallet;

said load station connected to said scissor lift wherein said scissor lift controls the position of said load station supporting the pallet being loaded while said wrapping means wraps the bundles stacked on the pallet; and a guide box is positioned in a horizontal plane and the horizontal position is controlled by said computer system so that the pallet locations of alternate bundle layers are offset for better load stability.

* * * * *

UNITED STATES PATENT AND TRADEMARK OFFICE
CERTIFICATE OF CORRECTION

PATENT NO. : 5,203,671
DATED : April 20, 1993
INVENTOR(S) : W.D. Cawley et al

It is certified that error appears in the above-indentified patent and that said Letters Patent is hereby corrected as shown below:

Column 1, line 33, delete "bundles" and insert therefor -- bundled --
Column 1, line 48, delete "bundles" and insert therefor -- bundled --
Column 2, line 35, after "location" insert -- . --
Column 6, line 1, delete "pellet" and insert therefor -- pallet --
Column 6, line 11, after "box" insert -- 68 --
Column 7, line 36, delete "cuase" and insert therefor -- cause --

Signed and Sealed this

Twenty-second Day of March, 1994

Attest:

BRUCE LEHMAN

*Attesting Officer*     *Commissioner of Patents and Trademarks*